United States Patent [19]

Hyman et al.

[11] Patent Number: 4,557,276
[45] Date of Patent: Dec. 10, 1985

[54] FOUR WAY LEVELING MECHANISM FOR COMBINE CLEANING APPARATUS

[75] Inventors: Myles Hyman; Ronald T. Sheehan; E. William Rowland-Hill, all of Lancaster, Pa.

[73] Assignee: Sperry Corporation, New Holland, Pa.

[21] Appl. No.: 659,934

[22] Filed: Oct. 11, 1984

[51] Int. Cl.$^4$ ............................................. A01F 12/32
[52] U.S. Cl. ................... 130/27 AE; 130/24; 130/27 Z; 56/10.2; 56/209; 209/416
[58] Field of Search ............... 56/10.2, 209, 210, 212, 56/DIG. 5, DIG. 10, DIG. 15, 14.6; 130/27 AE, 24, 25, 27 Z; 209/416

[56] References Cited

U.S. PATENT DOCUMENTS

| 366,242 | 7/1887 | Parnell | 130/27 AE |
| 1,064,440 | 6/1913 | Brown | 130/27 AE |
| 3,269,685 | 8/1966 | Wallace | 56/210 |
| 4,344,443 | 8/1982 | DeBusscher et al. | 130/27 Z |

FOREIGN PATENT DOCUMENTS 1313802 4/1973 United Kingdom .

Primary Examiner—Gene Mancene
Assistant Examiner—John G. Weiss
Attorney, Agent, or Firm—Larry W. Miller; Frank A. Seemar; Darrell F. Marquette

[57] ABSTRACT

A cleaning apparatus for a combine harvester is disclosed wherein the grain pan and chaffer sieve are mounted for pivotal leveling movement about both a transversely extending axis and a longitudinally extending axis. The grain pan and chaffer sieve are mounted in a subframe pivotally supported by a shaker shoe such that the subframe is pivotable about a longitudinally extending axis relative to the shaker shoe, which in turn is pivotally supported on the combine main frame for pivotal movement about a transversely extending axis. A pair of inclinometers disposed to sense the inclination of the combine are utilized to control the flow of hydraulic fluid to hydraulic actuators arranged to pivotally move the shaker shoe and the subframe in response to a sensing of a non-horizontal inclination by the inclinometers. A combination of the fore-and-aft and transverse pivotal movements permits the grain pan and chaffer sieve to be maintained in an overall horizontal orientation irrespective of the attitude of the combine main frame.

13 Claims, 4 Drawing Figures

FOUR WAY LEVELING MECHANISM FOR COMBINE CLEANING APPARATUS

BACKGROUND OF THE INVENTION

The present invention relates generally to combine harvesters and, more particularly, to improvements in the cleaning apparatus to permit a leveling thereof when the combine is operating under both transverse and fore-and-aft inclined operating conditions.

The operation of combine harvesters under non-horizontal conditions is less efficient than the operation of the combine on generally level ground because of the gravity induced movement of threshed grain in a downhill direction on the cleaning apparatus. This gravity induced movement creates an unbalanced loading of the cleaning mechanism and prevents a proper flow of air from a cleaning fan or series of fans through the threshed grain on the sieves to facilitate a removal of chaff and other debris. A lateral load unbalance shifts threshed grain to the side of the cleaning sieve and results in improper cleaning and higher grain losses. A fore-and-aft inclination of the sieves will result in the threshed grain being either retarded on the sieves or rushed toward the rearward end, which again results in improper cleaning action and/or high grain losses.

Attempts to maintain a combine cleaning apparatus in a horizontal orientation while the combine is operating under sidehill conditions can be found in U.S. Pat. No. 3,731,470 granted to G. K. Cornish et al. on May 8, 1973, and in U.S. Pat. No. 4,344,443 granted to C. R. J. DeBusscher on August 17, 1982. The apparatus disclosed in the Cornish patent provides a leveling of the entire frame of the combine through the operation of hydraulic cylinders to maintain the cleaning apparatus in a generally horizontal orientation. Since the entire combine is maintained in a level orientation, it was necessary to modify the connection of the crop harvesting header to the combine to permit a proper gathering of the crop material to be harvested.

The apparatus disclosed in the DeBusscher patent provides for a leveling of the entire cleaning mechanism, including the fan, about a longitudinally extending pivot axis; however, the DeBusscher mechanism does not provide for fore-and-aft leveling of the cleaning apparatus. The utilization of this leveling mechanism requires the use of a more complex, and therefore more expensive, main frame and drive train components. This complexity makes the elimination of a leveling mechanism to provide a stationary cleaning apparatus for use on flat land operations impractical. Furthermore, the DeBusscher mechanism is expensive to manufacture, is cumbersome to operate, results in an unnecessary shifting of major structural components and does not produce an overall leveling of the grain pan and chaffer sieve.

SUMMARY OF THE INVENTION

It is an object of this invention to overcome the aforementioned disadvantages of the prior art by providing an overall leveling mechanism for the cleaning apparatus in a combine harvester.

It is another object of this invention to pivotally support a shaker shoe mounting a grain pan and sieve mechanism for a generally fore-and-aft reciprocating movement such that the shaker shoe can be pivotally moved about a transversely extending axis.

It is an advantage of this invention that the efficiency of operation of the combine cleaning mechanism is increased under hillside operating conditions.

It is a feature of this invention that the pivotally mounted shaker shoe can be connected to an eccentric drive to affect a generally fore-and-aft shaking action to convey grain thereon in a rearward direction and facilitate the cleaning of threshed grain on the sieve mechanism.

It is still another object of this invention to maximize the efficiency of the cleaning mechanism in a combine harvester by evening the load of threshed grain on the grain pan and chaffer sieve under hillside operating conditions.

It is still another object of this invention to reciprocatably support a lower cleaning sieve from a shaker shoe pivotably mounted on the main frame for movement about a transversely extending axis.

It is another feature of this invention that a connecting link interconnecting the shaker shoe and the lower cleaning sieve to a frame mounting point telescopes to permit the shaker shoe to be pivotally moved relative to the lower cleaning sieve.

It is still another feature of this invention that only the grain pan and chaffer sieve are pivotally moved to minimize the weight of structural elements pivotally supported for movement relative to the main frame of the combine.

It is yet another object of this invention to control the fore-and-aft and transverse leveling of the cleaning mechanism automatically without the need for operator input.

It is another advantage of this invention that a four way leveling mechanism for a combine cleaning apparatus can be provided without requiring complex main frame structure and drive train components.

It is yet another feature of this invention that the cleaning apparatus leveling mechanism is operatively connected to inclinometers for automatically controlling the leveling movement in response to the sensing of fore-and-aft and/or transverse inclination of the main frame.

It is a further object of this invention to provide a cleaning mechanism in which the grain pan and chaffer sieve can be leveled in both a longitudinal and transverse direction.

It is a further feature of this invention that the leveling mechanism can be eliminated to provide an inexpensive flat lands combine with a stationary cleaning mechanism by mere elimination of actuators and control apparatus.

It is still a further object of this invention to provide a fore-and-aft leveling mechanism for the cleaning mechanism of a combine harvester which is durable in construction, inexpensive of manufacture, carefree of maintenance, facile in assemblage, and simple and effective in use.

These and other objects, features and advantages are accomplished according to the instant invention by providing a cleaning apparatus for a combine harvester wherein the grain pan and chaffer sieve are mounted for pivotal leveling movement about both a transversely extending axis and a longitudinally extending axis. The grain pan and chaffer sieve are mounted in a subframe pivotally supported by a shaker shoe such that the subframe is pivotable about a longitudinally extending axis relative to the shaker shoe, which in turn is pivotally supported on the combine main frame for pivotal movement about a transversely extending axis. A pair of inclinometers disposed to sense the inclination of the combine are utilized to control the flow of hydraulic fluid to hydraulic actuators arranged to pivotally move the shaker shoe and the subframe in response to a sensing of a non-horizontal inclination by the inclinometers. A combination of the fore-and-aft and transverse pivotal movements permits the grain pan and chaffer sieve to be maintained in an overall horizontal orientation irrespective of the attitude of the combine main frame.

BRIEF DESCRIPTION OF THE DRAWINGS

The advantages of this invention will become apparent upon consideration of the following detailed description of the invention, especially when taken in conjunction with the accompanying drawings wherein.

DETAILED DESCRIPTION OF THE PREFERRED EMBODIMENT

Figure 1:
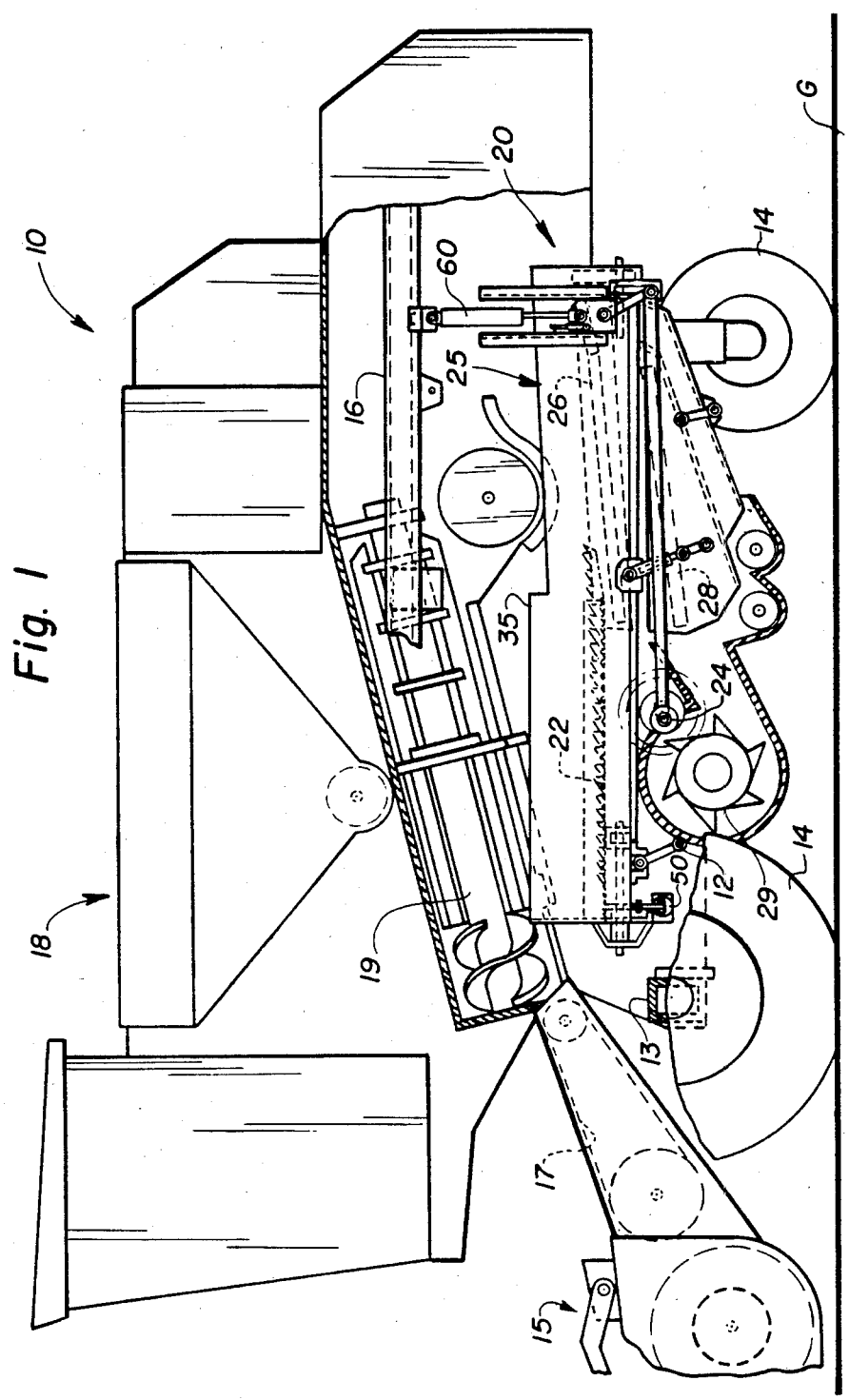
FIG. 1 is a side elevational view of a combine harvester incorporating the principles of the instant invention, portions of the side structure of the harvester being broken away to better show the invention.

Referring now to the drawings and, particularly, to Fig. 1, a side elevational view of a combine harvester incorporating the principles of the instant invention, can be seen. Any left and right references are used as a matter of convenience and are determined by standing at the rear of the machine, facing the forward end, the direction of travel. The combine 10 is provided with a main frame 12 having at least one transversely disposed beam 13 mobilely supported over the ground G by wheels 14. A crop harvesting header 15 is forwardly supported from the frame 12 to gather crop material and convey it rearwardly via a feeding mechanism 17 to a threshed and separating mechanism 19. The threshing and separating mechanism 19 is operable to thresh the crop material fed thereto and separate the threshed grain from the trash material to precipitate the threshed grain downwardly through the threshing and separating mechanism 19 and to discharge the trash material along a separate path to be deposited on the ground G rearward of the combine 10.

A cleaning mechanism 20 is positioned beneath the threshing and separating mechanism 19 to receive the threshed grain precipitated therefrom on a grain pan 22. Generally, the cleaning mechanism 20 is operatively connected to an eccentric drive 24 to affect a generally fore-and-aft reciprocating movement of the cleaning mechanism 20 to convey the thresh grain in a rearward direction. A sieve means 25 is positioned rearwardly of the grain pan 22 to receive threshed grain conveyed rearwardly therefrom and clean the threshed grain from chaff and other debris conveyed therewith. Typically, the sieve means 25 includes an upper chaffer sieve 26 and a lower cleaning sieve 28 mounted for opposing fore-and-aft reciprocating movement and in flow communication with air being blown from a fan 29 upwardly through the sieves 26,28 to remove chaff and debris from the threshed grain. It can be seen that when in a normal horizontal orientation the sieves 26,28 have a slightly upwardly inclination in a rearward direction. Cleaned grain passing through the sieve means 25 is conveyed into a storage tank 18 supported on the main frame 12.

Figure 2:
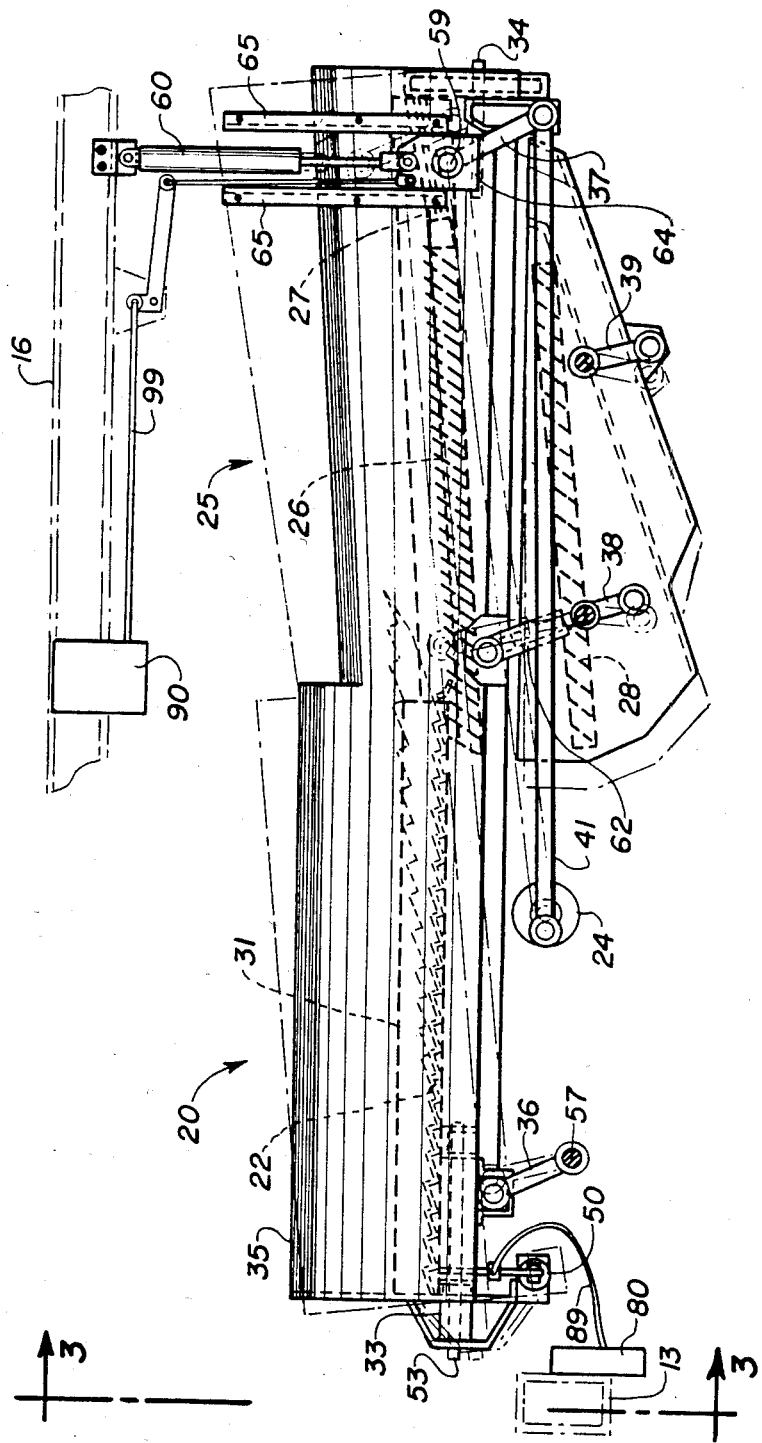
FIG. 2 is an enlarged partial cross sectional view of the cleaning apparatus seen in FIG. 1, the reciprocating movement of the cleaning apparatus being indicated by the phantom position of the lower cleaning sieve, the pivotal movement of the shaker shoe about a forwardly disposed transverse pivotal axis also being shown in phantom.
Figure 3:
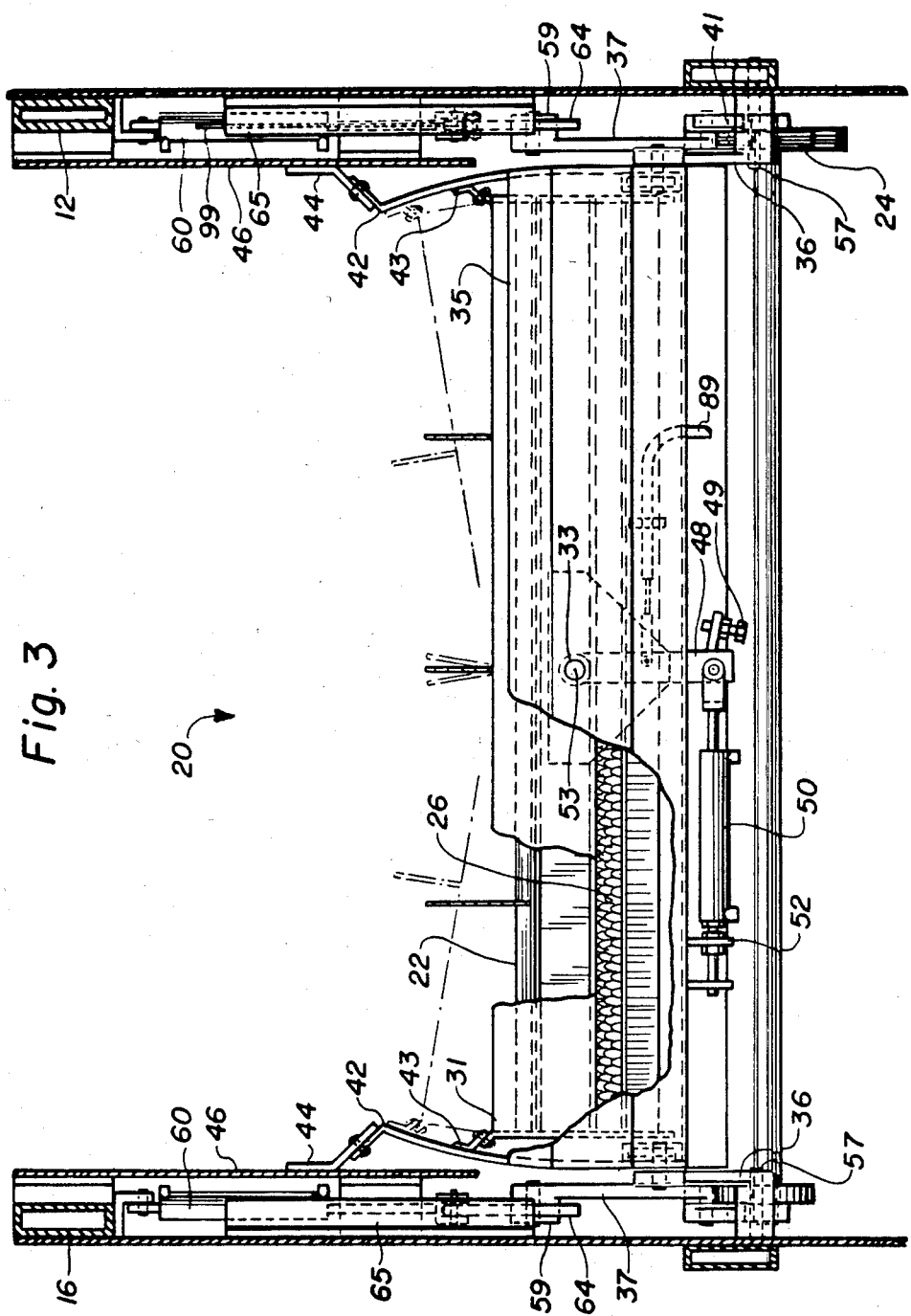
FIG. 3 is a partial cross-sectional end view of the cleaning apparatus shown in FIG. 2 as seen in the direction indicated by lines 3—3, the pivotal movement of a subframe pivotally mounting the grain pan and chaffer sieve about a longitudinally extending pivotal axis being shown in phantom.

Referring now to FIGS. 2 and 3, the details of the leveling mechanism can best be seen. The grain pan 22 and chaffer sieve 26 are mounted in a subframe 31 which in turn is pivotally supported by fore-and-aft extending and longitudinally spaced pivots 33,34 within a shaker shoe 35. A tailings return section 27 is positioned at the rear of the chaffer sieve 26 and is pivotally movable therewith. The tailings return section 27 is cooperable with conventional apparatus with return of unthreshed heads to the threshing and separating means 19. The shaker shoe 35 is pivotally supported from the frame 12 by a front connecting links 36, a rearward connecting links 37, and a central connecting links 38.

Each of the connecting links 36,37,38 incorporate rubber bushings in a conventional manner to permit a fore-and-aft reciprocating movement induced by a drive arm 41 interconnecting the eccentric drive 24 and the rearward link 37 supporting the shaker shoe 35. The lower cleaning sieve 28 is supported from the frame 12 by the central connecting links 38 and a supplemental connecting links 39 in a similar manner to permit a fore-and-aft reciprocating movement. By utilizing the center connecting links 38 with a frame mounting point intermediate the connection between the shaker shoe 35 and the lower cleaning sieve 28, the shaker shoe 35 and lower sieve 28 are drivingly reciprocated in opposing fore-and-aft directions in a manner conventionally known by one skilled in the art.

The shaker shoe 35 is provided with inwardly directed arcuate side members 42 to permit a sealing cooperation with longitudinally extending seals 43 connected to the subframe 31 and sweepingly engaging the inside of the arcuate side members 42 during pivotal movement of the subframe 31 relative to the shaker shoe 35. Additional longitudinally extending seals 44 are connected to the side members 42 of the shaker shoe 35 to sealingly engage vertically extending sidewalls 46 of the combine 10 to prevent the loss of threshed grain between the shaker shoe 35 and the sidewalls 46.

The subframe 31 is provided with a downwardly extending actuating arm 48. A hydraulic cylinder 50 interconnects a mounting tab 52 connected to the shaker shoe 35 and the actuating arm 48 for the pivotal movement of the subframe 35 about a fore-and-aft extending axis 53 defined by the front and back pivots 33,34. An adjustable stop bolt 49 engageable with the shaker shoe 35 serves as a limit to the amount of pivotal movement permitted to the subframe 31 in one direction, while the end of the retraction stroke of the cylinder 50 limits the movement of the subframe 31 in the opposing direction. The hydraulic cylinder 50 is operatively associated with a hydraulic system 70, described in greater detail relative to FIG. 4 below, to provide a flow of hydraulic fluid under pressure for operation of the cylinder 50.

The shaker shoe 35 is also mounted for pivotal movement about a transversely extending axis 57 corresponding to the frame mounting points of the front connecting links 36. The frame mounting point 59 for the rearward connecting links 37 is movably supported from a pair of transversely spaced hydraulic cylinders 60 to affect a fore-and-aft leveling movement of the shaker shoe 35, and consequently the grain pan 22 and chaffer sieve 26, through a pivotal movement of the shaker shoe 35 about the forwardly disposed transverse pivot axis 57 by raising and lowering the rearward end of the shaker shoe 35. To accommodate the pivotal movement of the shaker shoe 35 about the transverse axis 57, the center connecting links 38 include a telescoping portion 62, permitting a relative vertical movement between the chaffer sieve 26 and the lower cleaning sieve 28. To restrict any fore-and-aft movement of the frame mounting points 59 and thereby provide a proper fore-and-aft reciprocating movement induced by the eccentric drive 24, the frame mounting points 59 are housed in plates 64 positioned within generally vertically extending guides 65 to guide the movement of the plates 64.

Figure 4:
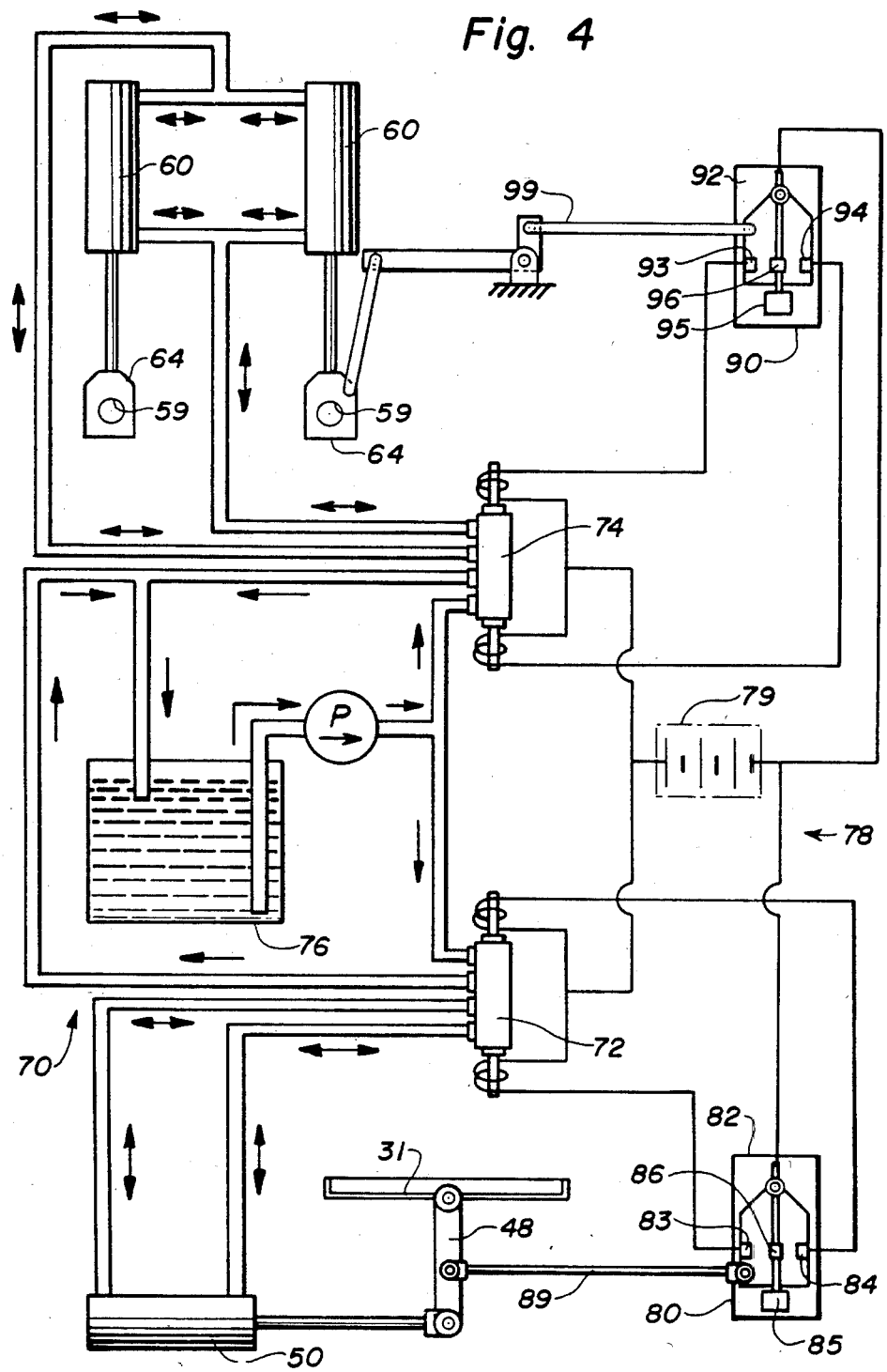
FIG. 4 is a schematic view depicting the hydraulic and electrical circuitry for pivotally moving the cleaning apparatus to obtain both fore-and-aft and laterally level orientations.

Referring now to the schematic diagram of FIG. 4 and the cross-sectional views of FIGS. 2 and 3, it can be seen that the hydraulic cylinders 50,60 are operably associated with the hydraulic system 70. A first solenoid valve 72 controls the direction of hydraulic fluid flow to the hydraulic cylinder 50, while a second solenoid valve 74 controls the flow of hydraulic fluid to the hydraulic cylinders 60. The solenoid valves 72,74 can be positioned to direct fluid to the respective hydraulic cylinders for either extension or retraction thereof or to circular fluid back to the reservoir 76 without affecting any movement of the hydraulic cylinders 50,60. The positioning of the solenoid valves 72,74 is controlled through an electrical circuit 78 connected to a battery 79 serving as a source of electrical power and to a pair of inclinometers 80,90.

Each inclinometer 80,90 includes a master member 82,92 having a first electrical contact 83,93 and a spaced apart second electrical contact 84,94. A pendulum 85,95 is pivotally mounted within the respective master member 82,92 for movement with the force of gravity relative to the master member 82,92. The pendulum 85,95 carries a third electrical contact 86,96 engageable with the respective first and second contacts to close the electrical circuit 78 and send a flow of electrical current from the battery 79 to the respective solenoid valve 72,74 as described in greater detail below. The position of the master members 82,92 relative to the main frame 12 is controlled through control links 89,99 in a manner also further described below.

The lateral inclinometer 80 is mounted on a transversely extending beam 13 forming a part of the main frame 12. As the combine 10 encounters side hill operating conditions, the transverse beam 13 becomes inclined to the horizontal; however, the pendulum 85 follows the force of gravity and moves relative to the master member 82. Sufficient lateral inclination of the combine 10 will cause the third contact 86 to engage either the first or second contacts 83,84 to close the electrical circuit and direct a flow of hydraulic fluid to the hydraulic cylinder 50, which in turn affects a pivotal movement of the subframe 31 to move the subframe 31 toward a level orientation relative to the main frame 12. The corresponding movement of the actuating arm 48 pulls on the control link 89 to cause a movement of the master member 82 relative to pendulum 85 until the electrical contact 86 on the pendulum 85 breaks engagement with the respective contact 83 or 84 on the master member 82. As a result, the solenoid valve 72 is permitted to return to a neutral position thereby locking the hydraulic cylinder at the position to which it has been moved. Subsequent changes in the lateral inclination of the combine 10 results in a similar operation to affect a movement of the subframe 31 in one direction or another with the subframe 31 always seeking a level orientation.

The operation of the hydraulic system 70 to control the fore-and-aft leveling operation is similar to the lateral leveling mechanism described above. A longitudinal inclinometer 90 is mounted on a fore-and-aft extending frame member to sense the inclination threof in a manner similar to that described above for the lateral inclinometer. Movement of the pedulum 95 relative to the master member 92 is induced by the force of gravity and affects an engagement of the third contact member 96 with one of the first or second contacts 93,94. The result is a closing of the electrical circuit 78 to energize the solenoid valve 74 and direct the flow of hydraulic fluid to the hydraulic cylinder 60 to cause a pivotal movement of the shaker shoe 35 about the transverse pivot axis 57. The movement of the plate 64 housing the rearward frame pivots 59 causes the control linkage 99 to move the master member 92 relative to the longitudinal frame member 16 and the pendulum 95 until the electrical circuit 78 is broken and the shaker shoe 35 has attained a generally horizontal fore-and-aft orientation. One skilled in the art will readily realize that an operation of the fore-and-aft and lateral leveling mechanisms described above will result in a maintenance of the grain pan 22 and chaffer sieve 26 in a generally horizontal orientation in both the fore-and-aft and transverse directions irrespective of the actual orientation of the main frame 12 when the combine 10 is operating uphill, downhill or on sidehills in either direction. Further description of the construction and operation of the above-described control mechanism can be found in co-pending U.S. patent application entitled "Lateral Leveling Mechanism for Combine Cleaning Apparatus" and given Ser. No. 659,932, filed Oct. 11, 1984, the description of which is incorporated herein by reference.

It will be understood that changes in the details, materials, steps and arrangements of parts which have been described and illustrated to explain the nature of the invention will occur and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A combine harvester comprising:
   a mobile main frame adapted for movement across a field;
   threshing and separating means mounted on said main frame to thresh crop material fed thereto and to separate threshed grain from trash material, said threshing and separating means conveying threshed grain along a path of travel;

cleaning means supported by said main frame along said path of travel to receive threshed grain from said threshing and separating means and to clean debris from said threshed grain, said cleaning means being mounted for pivotal movement about a longitudinally extending axis and about a transversely extending axis to permit said cleaning means to be leveled relative to said main frame, said cleaning means including a subframe, in which is mounted a grain pan and a chaffer sieve, and a shaker shoe pivotally supporting said subframe for movement about said longitudinally extending axis relative to said shaker shoe, said shaker shoe being pivotally mounted on said frame for pivotal movement about said transversely extending axis relative to said main frame; and actuating means operatively associated with said cleaning means to pivotally move said cleaning means about said longitudinally and transversely extending axes.

2. The combine harvester of claim 1 wherein said actuating means includes control means for sensing the fore-and-aft and transverse inclinations of said main frame and actuators connected to said cleaning means and operatively associated with said control means to effect a pivotal movement of said cleaning means in response to the sensing of a change in inclination by said control means to maintain said cleaning means in a level attitude.

3. The combine harvester of claim 2 wherein said shaker shoe is connected to one of said actuators to effect pivotal movement thereof about said transversely extending axis.

4. The combine harvester of claim 3 wherein said shaker shoe is mounted for oscillatory motion in a generally fore-and-aft extending direction.

5. The combine harvester of claim 4 wherein said control means includes a first inclinometer mounted on a transversely extending portion of said main frame to sense the lateral inclination of said main frame and a second inclinometer mounted on a longitudinally extending portion of said main frame to sense the fore-and-aft inclination of said main frame.

6. The combine harvester of claim 5 wherein said actuators are hydraulic cylinders connected to a hydraulic circuit operatively controlled by said inclinometers.

7. A cleaning mechanism, supported on a main frame of a combine harvester to clean debris from threshed grain comprising:

a shaker shoe pivotally suspended from said main frame for oscillatory movement in a generally fore-and-aft extending direction, said shaker shoe being pivotally supported by said main frame along a first pivot axis and a longitudinally spaced second pivot axis to permit said oscillatory movement;

a subframe pivotally mounted in said shaker shoe for movement about a longitudinally extending axis, said subframe mounting a grain pan and a chaffer sieve;

a first actuator interconnecting said main frame and said second pivot axis to effect a pivotal movement of said shaker shoe about said first pivot axis;

a second actuator interconnecting said shaker shoe and said subframe to effect a pivotal movement of said subframe about said longitudinally extending axis relative to said shaker shoe; and control means operatively associated with said first and second actuators to sense the transverse inclination and the longitudinal inclination of said main frame relative to a horizontal orientation and manipulate said first and second actuators to pivotally move said shaker shoe and said subframe to keep said subframe in a horizontal orientation to evenly distribute the load of threshed grain on said grain pan and said chaffer sieve.

8. The cleaning mechanism of claim 7 wherein said control means includes a first inclinometer mounted on said main frame to sense the fore-and-aft inclination of said main frame and a second inclinometer mounted on said main frame to sense the lateral inclination of said main frame.

9. The cleaning mechanism of claim 8 wherein said first inclinometer is operatively associated with said first actuator to control the operation thereof in response to the fore-and-aft inclination of said main frame, said second inclinometer being operatively associated with said second actuator to control the operation thereof in response to the lateral inclination of said main frame.

10. The cleaning mechanism of claim 9 wherein said first and second actuators are hydraulic cylinders.

11. The cleaning mechanism of claim 9 wherein said first pivot axis is spaced forwardly of said second pivot axis.

12. The cleaning mechanism of claim 11 wherein said shaker shoe is connected to an eccentric drive to cause said oscillatory motion.

13. The cleaning mechanism of claim 12 wherein said shaker shoe is suspended from said first and second pivot axes, respectively, by first and second pairs of connecting links, said eccentric drive being connected to said second pair of connecting links.

* * * * *